United States Patent [19]

Van den Berghe

[11] Patent Number: 5,467,693

[45] Date of Patent: * Nov. 21, 1995

[54] PRODUCTION OF GRANULAR CRACKERS

[76] Inventor: René Van den Berghe, Baneike 24, B9660 Brakel, Belgium

[ * ] Notice: The portion of the term of this patent subsequent to Apr. 7, 2009, has been disclaimed.

[21] Appl. No.: 7,212

[22] Filed: Jan. 22, 1993

Related U.S. Application Data

[63] Continuation-in-part of Ser. No. 949,889, Nov. 24, 1992, abandoned.

[30] Foreign Application Priority Data

Jan. 24, 1991 [WO] WIPO ............... PCT/BE91/00005
Jan. 24, 1992 [EP] European Pat. Off. ............. 92200184

[51] Int. Cl.$^6$ ............................. A23L 1/18; A21B 5/02
[52] U.S. Cl. ............................. 99/353; 99/349; 99/427; 99/483
[58] Field of Search ...................... 99/323.4, 349, 99/352, 353, 355, 372, 373, 426, 427, 439, 331, 483; 426/446, 512, 523; 425/4 R, 256, 261, 447, 150, 157, 159

[56] References Cited

U.S. PATENT DOCUMENTS

| | | | |
|---|---|---|---|
| 3,949,660 | 4/1976 | Kuhlman | 99/352 |
| 4,281,593 | 8/1981 | Gevaert | 99/349 |
| 4,328,741 | 5/1982 | Yoshikazu | 99/332 |
| 4,909,719 | 3/1990 | Bielfeldt | 100/93 P |
| 5,102,677 | 4/1992 | Van Den Berghe | 99/349 |

FOREIGN PATENT DOCUMENTS

| | | |
|---|---|---|
| 0241972 | 10/1987 | European Pat. Off. . |
| 0359740 | 9/1988 | European Pat. Off. . |
| 0344867 | 12/1989 | European Pat. Off. . |
| 2617014 | 12/1988 | France . |

OTHER PUBLICATIONS

Patent Abstracts of Japan, vol. 14, No. 342 (C–743) [4285], 24th Jul. 1990; & JP–A–2 129 035 (Olympus Optical Co.) 17 May 1990.
Derwent File Supplier WPIL, 1989, accession No. 86–023638[04], Derwent Publications Ltd, London, GB; & JP–A–60 244 257 (Baika Kogyo K.K.) 4 Dec. 1985.
Derwent File Supplier WPIL, 1989 accession No. 90–161311 [21]; Derwent Publications Ltd, London, GB; & JP–A–2 104 496 (Kao Corp.) 17 Apr. 1990.

Primary Examiner—Timothy F. Simone
Attorney, Agent, or Firm—Shlesinger, Arkwright & Garvey

[57] ABSTRACT

In a cracker production apparatus of the type comprising a heatable mould consisting of a stationary upper mould element, a movable ring mould and a reciprocating lower mould element or punch driven by a hydraulically actuated toggle-mechanism, the improvement wherein a twin-head mould arrangement for high rate, automatic manufacture of uniformly expanded crackers is driven by a single hydraulic drive unit formed of two aligned, cooperating double-action pistons, whereby a first piston is adapted to control, in combination with specific central program/microprocessing means, an adjustable final baking pressure, and a second piston to regulate a desired expanded cracker thickness, and this independant of grain feed and/or apparatus related mechanical parameters. Advantageously two twin-head machines are arranged in tandem with a single hydraulic drive unit and mutually connected toggle members whereby a cracker conveyor belt passes between the cracker discharge chutes of said tandem arrangement of twin-head machines. The ring moulds may be designed for allowing multiple cracker production in each mould set.

15 Claims, 9 Drawing Sheets

FIG. 6a
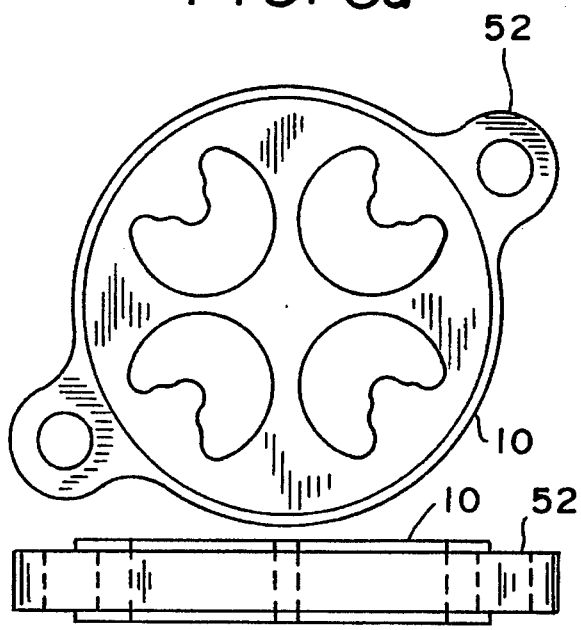
FIG. 6b
FIG. 6c
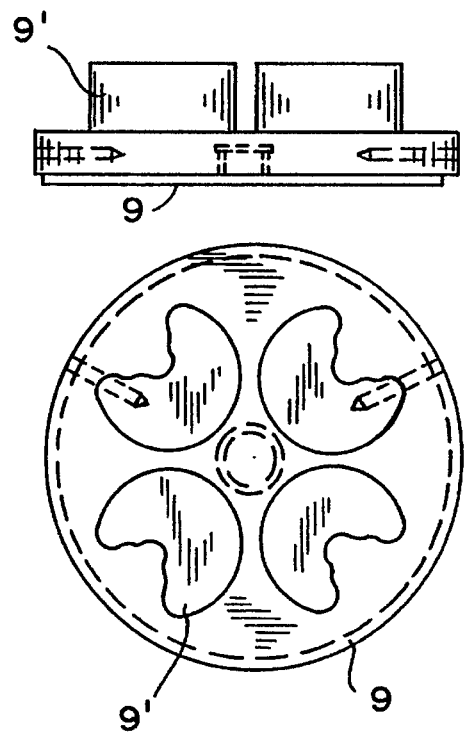
FIG. 6d
FIG. 6e
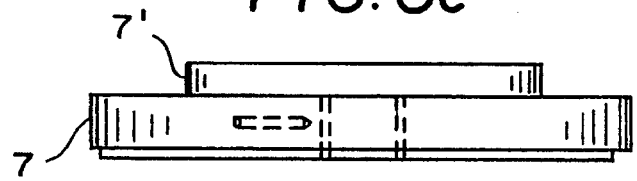
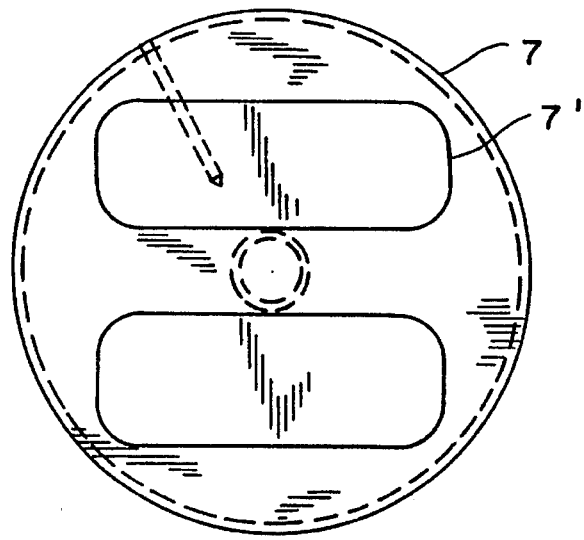
FIG. 6f

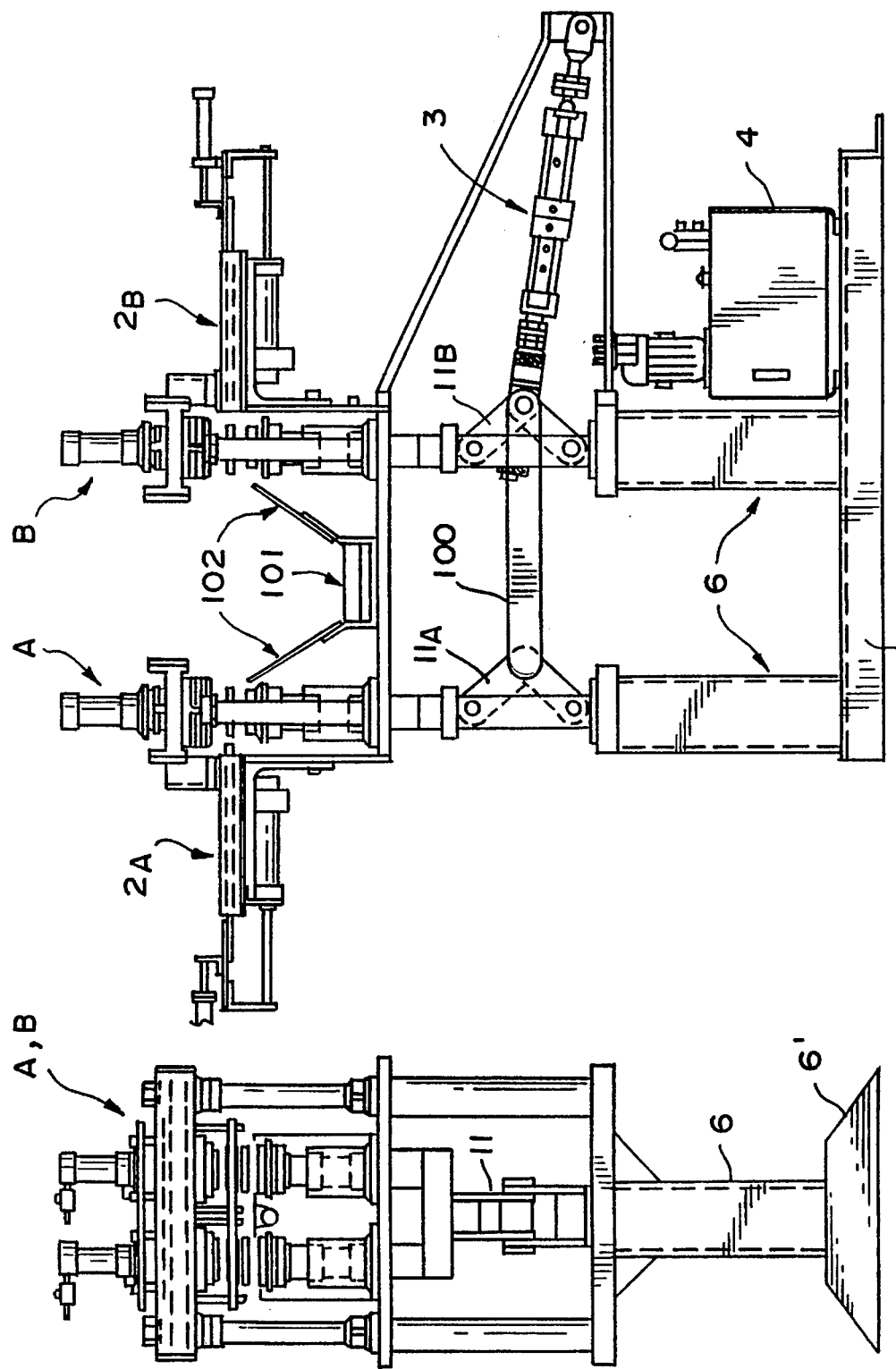

PRODUCTION OF GRANULAR CRACKERS

This application is a continuation-in-part of U.S. Ser. No. 07/949,889, filed Nov. 24, 1992, now abandoned.

FIELD OF THE INVENTION

The present invention pertains to the field of manufacturing expanded food products by a direct pressure-baking process. Accordingly cereals such as rice, corn, wheat, barley, oats, soja beans and mixtures of said granular raw materials, including broke and optional taste additions, are subjected to baking or roasting under high crushing pressure in a heated mould and thereafter caused to expand in the form of a selfsustaining cracker or cake of desired shape and thickness. More in particular the invention relates to an improved automated apparatus for the mass production of granular crackers under closely controlled pressure-baking and expansion conditions. This invention particularly concerns an equipment enabling a greatly increased output per machine unit, and to an automatic production line comprised of a plurality of such units.

BACKGROUND OF THE INVENTION

An equipment for expanded cracker manufacture is notably described in Belgian Patent BE-A-1000311 and in European Patent EP-A-0359740, which are both assigned to the same inventor as the present invention.

The basic components of the equipment disclosed in said documents is incorporated herein by reference and do form the starting point of the present invention.

The previously proposed machine improvements in BE-A-1000311 mainly concerned the provision of a novel hydraulic drive and control unit formed of two aligned double-action cylinders, integrally assembled in one drive block and capable of selectively displacing the common drive shaft thereof in controlled sequential steps. Said drive shaft actuates a toggle-mechanism that is connected to a lower punch for slidingly reciprocating the same in and out of a mould cavity defined in a fixed upper mould. An adjustable micro-switch contact may be provided between the upper toggle arm and a switch support on the machine frame to control the end of the driving stroke of one of the operating cylinder pistons and hence the uppermost compression position of the punch. Said drive and control arrangement ensures a reliable continuous operation of the machine without risk of overload and enables the obtainment of uniformly expanded crackers of constant thickness.

In EP-A-0359740 there is further disclosed a unique three-part mould configuration, characterized by a separately actuated peripheral mould element constituting thus a movable peripheral side-wall of a fixed upper mould. Said peripheral ring mould is capable of being tightly pressed against a heatable fixed upper mould plate and of slidably receiving a lower heatable punch for crushing and pressure-baking a given quantity of granular material in the hermetically closed, heated chamber formed by the three cooperating mould elements. At the expansion stage of a cracker production cycle the punch is quickly drawn back a small distance within said chamber which is still closed, and thereafter the ring mould is slided downwards along the partially withdrawn punch received therein, which are then both lowered until the expanded cracker resting on the punch head can be readily discharged therefrom by a pushing element of the grain feeding slide. Said arrangement has the important advantage of efficaciously solving the unpredictable occurence of mould sticking, which was hereto a major cause of inferior cracker quality, mould contamination and frequent machine downtime. Notwithstanding the already achieved significant improvements, there was still a large need for further developments in such equipment. For mass production of different cracker types a better control of baking pressure and expansion conditions was required, especially at increased production rates, and in this connection a flexible and efficient control was needed to cope with unavoidable variations in grain feed and cereal type parameters. Furthermore there was a real need for increasing the production capacity of a single machine unit, bearing in mind that its advanced hydraulic drive and control means is an expensive piece of technology.

Indeed, when operating an equipment as discribed in EP-A-0359740 at higher speeds, machine perturbations and poor cracker quality was often noticed, which was assumed to be due to a too slow reaction velocity of the hydraulic drive system and to undesirable variations of final baking pressure due to the previously used microswitch system for controlling the end point of the forward stroke of the actuated drive piston. The latter was assumed to be due to inevitable mechanical straining (elasto-plastic) of repeatedly stressed machine parts, incl. the toggle-mechanism, and further to certain variations in cereal supply conditions (grain size, volume, weight; cereal type) which affect the grain crushing "strength—strain" curve and hence the attainable pressure in the mould for a preset adjustment position of the microswitch end control means. To overcome these remaining deficiencies the present inventor came to the finding, after extensive studies and trials, that an improved design of the hydraulic system of the drive unit was necessary, including the provision of a novel means for controlling the end point of the pressurizing stage. Furthermore the need of a greatly increased cracker-production capacity of a single machine or of a production line comprising plural machines, could be met in a most effective way by a novel twin-head mould-configuration of the present invention, which solution was found to be far superior and most reliable in comparison with numerous other (theorktical and practical) possibilities for raising machine output such as higher drive speeds, shorter baking cycles, multichamber dies (cf. FR-A-2017014) and the like; these alternatives proved to be unsuitable for continuous high-rate cracker production because of mechanical and hydraulic deficiencies, incl. inconsistent production quality.

OBJECTS AND SUMMARY OF THE INVENTION

According to a first aspect of this invention an apparatus of the type disclosed in EP-A-0359740 is doubled in capacity by the provision of two three-part mold sets mounted in a suitably stabilized frame to ensure perfect alignment of the cooperating resp. fixed upper mold elements, movable ring molds and reciprocating punches, whereby the two punches are operatively connected to a single drive system comprised of a toggle-mechanism and a hydraulic jack including two double-action pistons as described in EP-A- 0359740, but wherein the end-switch means to stop the forward drive (uppermost pressure-baking position of the punches within their respective mold cavities) is omitted and replaced by a novel control means incorporated into the hydraulic jack control means of the apparatus.

According to a second main aspect of this invention the oil cylinders of the tandemized driving pistons of the jack comprise novel constructional features capable of minimizing friction and drag of the activated jack shaft, especially when the latter moves backwards upon oil pressure release and corresponding cracker expansion.

According to a further improvement aspect, the hydraulic jack comprises an additional oil drain line, connected to an oil feed line of cracker expansion regulating cylinder piston, which drain line is openable and closable by a suitable valve and has an outlet flowing directly into an oil reservoir of the hydraulic system, i.e. by-passing thus the proper oil-pressurizing block of the pressure-oil circuit. This measure enables to regulate, in particular to increase, the rate of oil removal during the expansion phase and hence the withdrawal speed of the punch to a preset expansion position, which leads to puffed crackers of optimum quality (expansion degree, colour, . . . ).

Still another object is to provide a high-capacity production line consisting of a plurality of such double-head apparatus, which apparatus may advantageously be assembled in a tandem arrangement along a cracker discharge belt. An additional object of the invention is the provision of such a high-capacity production line equipped with cracker transfer, coating and collecting means. According to the invention these and other objects are basically achieved by an apparatus characterized by technical features defined in the main claims. and preferred embodiments of the inventive apparatus are defined in the appended subclaims taken in conjunction with description and figures. Other details and features of the invention will stand out from the following description, given herebelow by way of non-limitative examples and with reference to the accompanying drawings, wherein

DESCRIPTION OF THE DRAWINGS

FIGS. 6a-b-c-d-e-f illustrate ring mould designs for producing multiple crackers in one mould set FIG. 7 schematizes a component of the central control means FIGS. 8a-b show a tandem machine arrangement having a single hydraulic drive for two twin-head machines

DETAILED DESCRIPTION OF THE INVENTION

Figure 1:
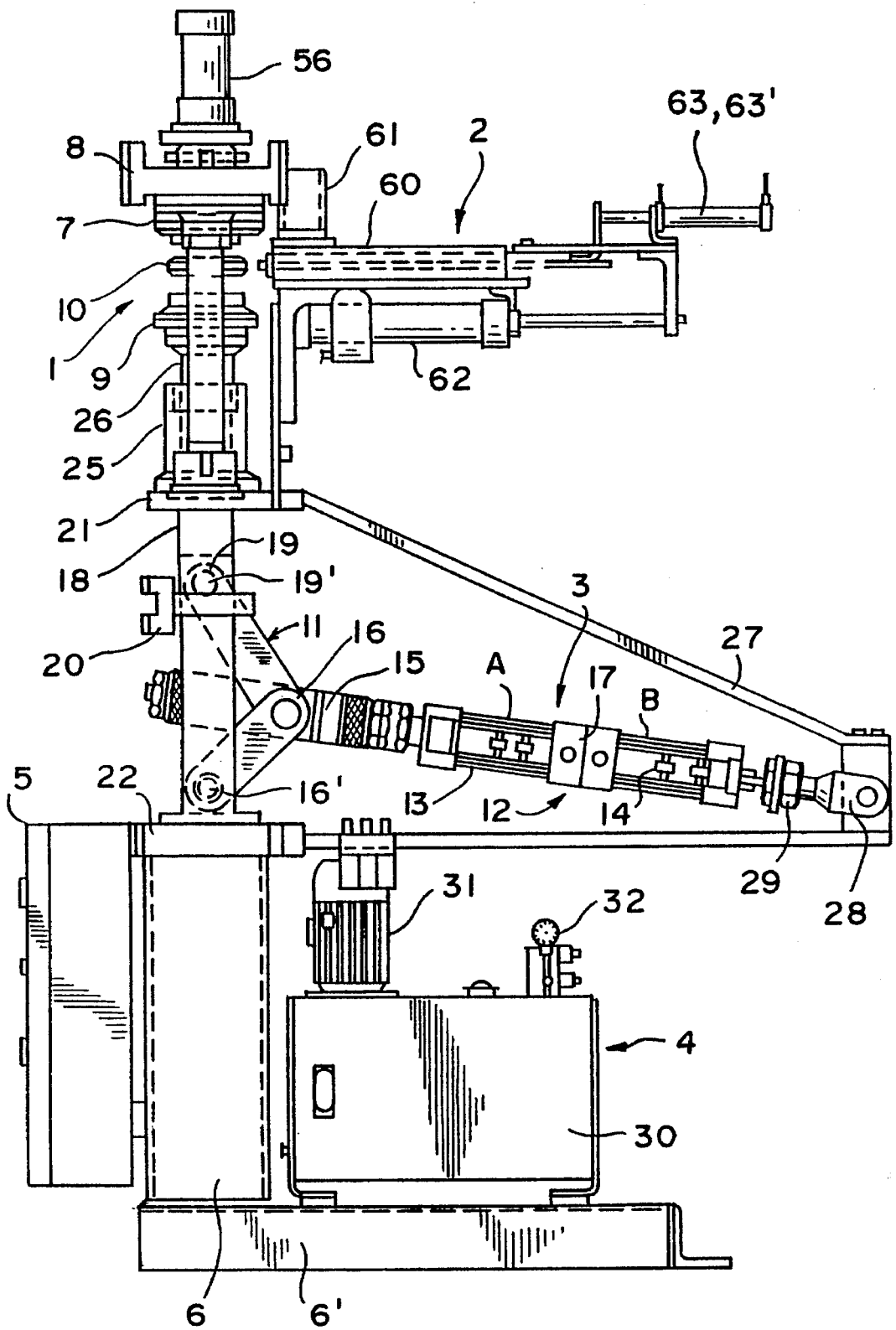
FIG. 1 gives a side view of a preferred twin-head apparatus embodiment according to the invention
Figure 2:
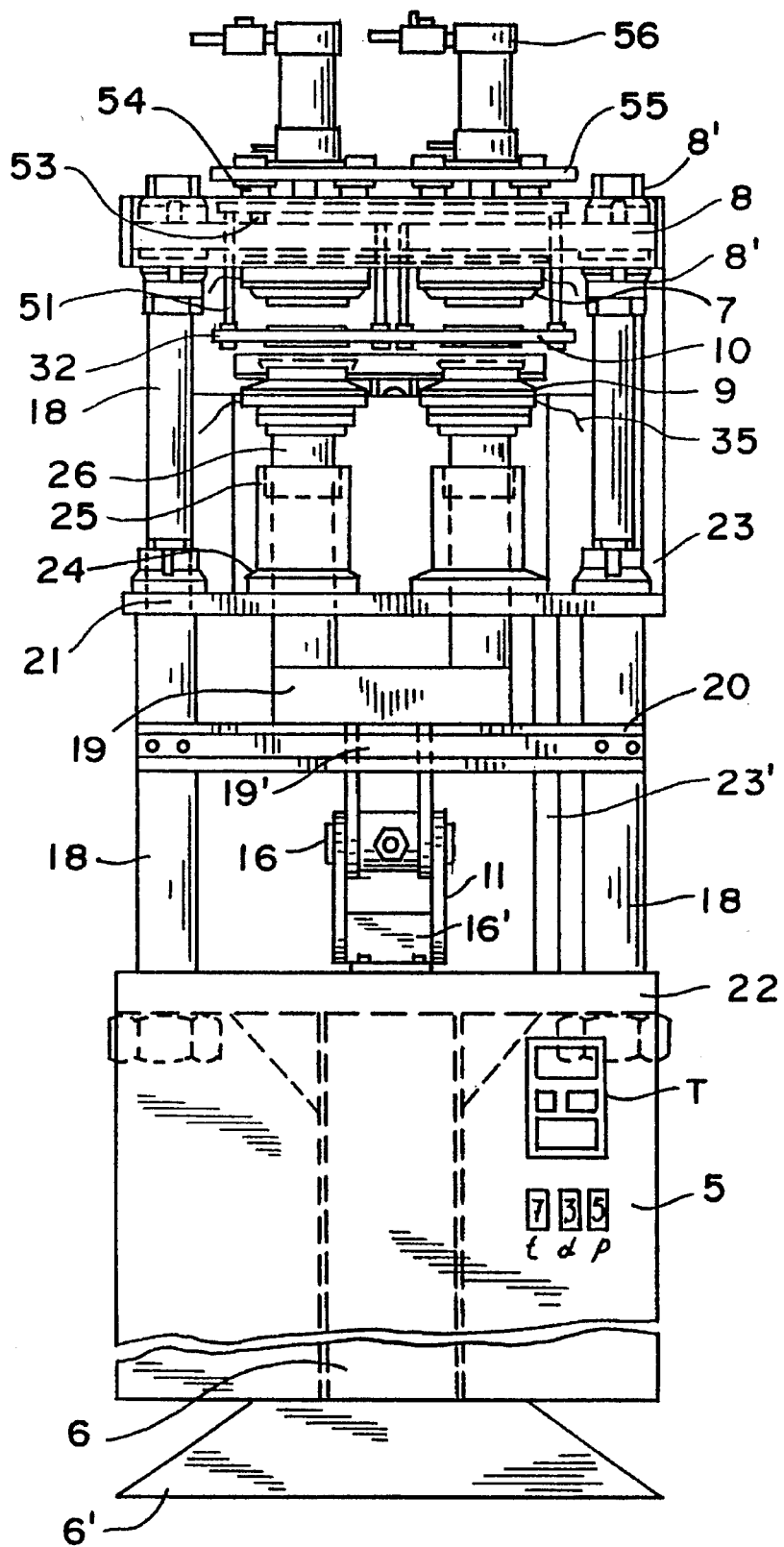
FIG. 2 is a front view of the apparatus shown in FIG. 1

Referring to FIGS. 1 and 2, there is shown a preferred embodiment of a high-capacity cracker production apparatus according to this invention, which basically features a twin-head arrangement of two three-part moulds and one common drive block. The latter comprises the novel hydraulic drive and control improvements of this invention as described hereinbelow. A two-arm toggle mechanism connected to the drive shaft of the hydraulic drive block transmits the hydraulic power to the two lower punches linked to the upper toggle arm for selective simultaneous actuation of the same.

This apparatus features a compact and most efficient design whereby all the mechanical and functional machine parts are arranged on a single selfsustaining frame such that the machine forms an autonomious unit that can be easily installed, deplaced and grouped according to required plant lay-out and available space. The main machine components comprise moulding means (1), feeding means (2), hydraulic driving means (3), hydraulic power means (4) and central command, control and monitor means (5) which are assembled onto a columnar machine frame comprised of two vertical posts (18) which are mounted on base support (6) with base plate (6').

Two three-part mould sets (1) are arranged side by side between supporting columns (18) and consist each of a fixed upper mould element (7), a driven lower mould element or punch (9) and a movable peripheral mould element or ring mould (10) which cooperate to define a compressable, heatable mould cavity therein. Upper and lower mould elements (7,9) are separately heated and temperature controlled allowing independant adjustment of required temperatures in both upper and lower mould elements of each mould set. A fixed upper mould plate (8) connecting the vertical posts (18) bears the fixed upper moulds (7) which are disposed at the underside thereof. Said mould plate (8) is finely adjustable in height by suitable fastening elements (8') at the upper part of the columnar posts (18). This height regulation allows precise adaption of the fixed position of the upper moulds (7) in relation to a required preset top position of the punches (9) corresponding to a safe (unlocked) uppermost position of the fully raised togglemechanism (11), and further to achieve perfect parallellism between upper and lower mould surfaces. The ring moulds (10) and their actuators are fixed to the mould plate (8) with the actuators disposed above said plate, as will be described into more detail hereinbelow with reference to FIG. 5.

The two punches (9) are driven up and down by drive means (3) consisting of a hydraulic drive unit (12) with two cooperating pistons (13,14) actuating a drive shaft (15), and of a toggle-arm mechanism (11) having a central hinge block (16) connected to drive shaft (15).

The two punches (9) have parallel lower shaft members (26) slidably guided in bearing bushes (25) which have cylindrical housings (24) mounted on a horizontal support plate (21) which is fixedly connected to frame posts (18). Between mould plate (7) and support plate (21) there are erected (preferably 4) regulable stiffening rods (23) which connect the 4 corners of the respective underside and upperside of mould plate (7) and support plate (21). In this way the cooperating guiding parts of the mould elements are adjustably secured against possible mismatch or distortion during running of the machine. Similar stiffening bars (23') may be provided between support plates (21) and (22), although it is more preferred here to select a distortion-proof heavy column design.

The lower ends of punch shafts (26) are mounted on a horizontal cross-bar (19) which forms at its lower part a movable hinged connection (19') with the upper arm of the toggle-mechanism (11).

In this way the two punches are simultaneously driven up and down. The lower arm of the toggle-mechanism rotates around a fixed hinged connection (16') solidary with upper support plate (22) of frame support (6). A security stop plate (20) horizontally mounted between machine posts (18) prevents toggle-mechanism (11) from being pushed over its dead point or vertically erected position (180 degrees for max.angle formed by toggle-arms).

In pratice the angle between erected upper and lower toggle arms is adjusted to a maximum value below 180 degrees, preferably about 170 to 178 degrees, which determines the uppermost position of the punch against the fixed upper mould (8) (without grain feed). Said preset value can be adjusted by means of height regulable mould plate (7) in conjunction with a given dimensional design of drive unit, drive shaft and toggle mechanism. Drive unit (3,12) is mounted in a side frame (27) affixed to bearing plates (21) and (22) of the main frame, located above hydraulic power group (4). The back side of the drive unit is prolonged with a shaft (29) which forms a fixed hinge connection (28) with side frame (27). The hydraulic power group (4) mounted on base plate (6') basically comprises a hydraulic container (30) with motor (31). Pressure-control gauge (32) monitors hudraulic pressure and may comprise overpressure limiting means. Alternatively overpressure may be controlled by power-overload limiting means associated with motor (31). Suitable hydraulic valves and tubing provided for powering hydraulic cylinders A and B of unit (12) is not shown in the drawing. The central control panel (5) mounted to the lower front side of the machine frame (6) groups all necessary command, switch, control, program and display functions. It comprises a central processing unit loaded with a cracker production program wherein the following adjustable main parameters are integrated: baking time (t), baking pressure (p) and cracker expansion thickness (d). Desired combinations of these parameters can be selected, within predetermined (program) limits, by suitable positions of their respective command knobs or buttons. Alternatively and/or in addition thereto, the machine program/steering unit may be connected to a central computer, which collects machine parameters and production data (monitoring function) and from which the machine program can be adapted (command function). Plural machines may be connected to said central computer unit, thereby allowing individual and simultaneous supervision/control of a production line consisting of a large number of autonomious machines. Furthermore the processing unit controls the required actuation sequence of the cooperating hydraulic pistons (13,14) and the command sequence of the pneumatic cylinders (42,43,56) actuating the feed means (2) and the ring mold elements (10).

The central control panel also comprises a separate processing unit for controlling upper and lower mold temperatures of the two-mould sets and for accordingly supplying electric power to the resistance heating elements (35) mounted in the interior of upper mould elements (7) and the punch heads (9). Thermocouple means (not shown) conveniently integrated in each of said mould elements give a direct readout (displayed on control panel) of instant upper and lower mould temperatures, and the electric signal is directly converted, preferably by the intermediate of a special "self-tuning" program running on said processing unit, in an adjustable supply of electric power to the resistance heaters of the respective mould elements, taking into account preset mould temperature, ambient thermal conditions and instantaneous cracker production conditions (weight, thickness, production rate . . .).

In this way actual mould temperatures can be kept within a narrow range of about +/−1 degree Celsius of preset temperature, notwithstanding fluctuating production circumstances.

Feeding means (1) includes a feeding plate 60 with dosimeter slides and pneumatic cylinders 62 and 63,63' for actuating said plate and slides. Reference numeral 61 is a grain supply tube.

The installed novel means for ensuring a precise control of cracker preparation in terms of ultimate baking pressure (Pu) and expanded cracker thickness (d) according to the present invention are greatly improved over previous control means in that they are no longer sensitive to normal variations in grain feed parameters and to certain mechanical limitations of the used drive and transmission members, which otherwise affected the final crushing/compressing stroke and further the thickness and surface shape/structure of a finished cracker. In a preferred embodiment said novel means comprise the proper combination of a redesigned quick-reacting hydraulic drive system and of specific hydraulic power control means steered from the central control panel.

Figure 3:
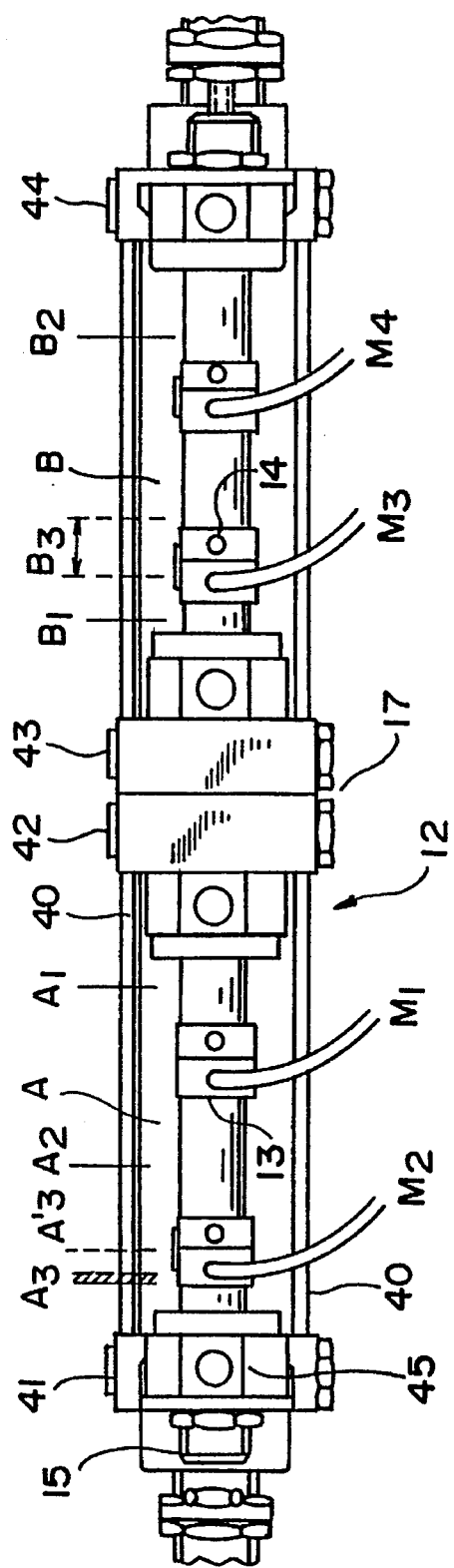
FIG. 3 gives a schematic view of improved drive and control means according to the invention
Figure 4:
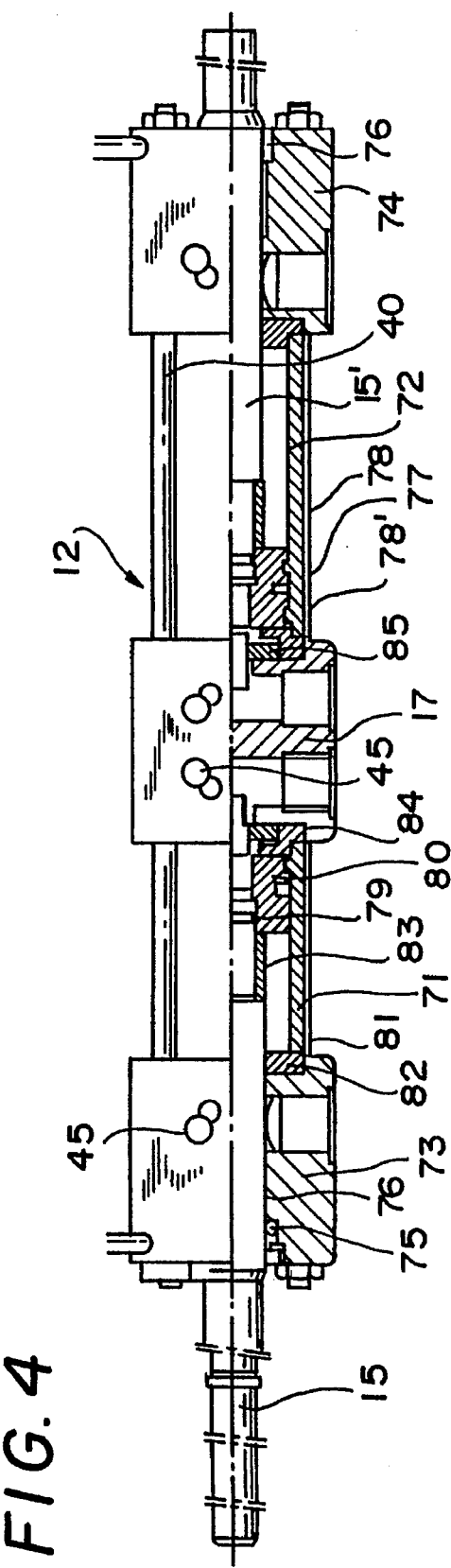
FIG. 4 is a lenghtwise cross-section of a preferred embodiment of FIG. 3.

The improved hydraulic drive and control unit is illustrated in FIGS. 3 and 4. Referring to FIG. 3, schematizing a hydraulic drive block 12, it is shown that two double action cylinders A and B are aligned and fitted in a traction frame comprising 4 traction bars 40 and end flanges 41,42,43 and 44 with adjacent flanges 42,43 forming the block separation mid flange. Reference M represents the adjustable magnetic contacts M1 to M4; these are slidably located in predetermined positions which define the basic displacement regions or stroke lengths of the hydraulic pistons, actuated in a given sequence by the central control unit 5. The left cylinder A, driving shaft 15 connected to the toggle-mechanism, is adapted to perform the function of baking pressure controlling means.

The right cylinder B is adapted to function as expansion controlling means. Magnetic contacts M1 and M3 placed in positions A1 and B1 close to mid flange 17 define the retracted position of piston 13 of cylinder A and of piston 14 of cylinder B. When both pistons are withdrawn into A1 and B1, the mould is fully open with the punch in a lowermost position below the feeding slide (alarm or servicing position when machine is stopped). Contact M2 placed in A2 (with M3 in B1) defines the operating start or end position of the punch corresponding to grain feeding/cracker ejection. Contact M2 placed in B2 sets a given stoke lenght B1-B2 of oppositely displaced piston 14 of cylinder B, the amount of which defines the fall-back height of the punch in the reverse cycle B2-B1 of piston 14 of cylinder B.

Hence B1, located close to mid flange 17, also defines therein a stable fall-back position for the punch upon explosive expansion of the crushed pressure-roasted grains. In a cracker production cycle, piston 13 is first moved to its operating start position A2 and therafter piston 14 is displaced from B1 to B2. At this point piston 13 will commence its compression stroke from A2 to A3. Said stroke includes the last grain-crushing upward movement of the punch and the ultimate baking pressure build-up in the mould. In earlier apparatus designs, the end of the compression stroke was controlled by an end switch element, e.g. a contact placed in a position A3 and/or by an adjustable microswitch contact elements working between a toggle arm and a fixed frame member. These adjustable contact means basically function on a preset approaching distance, which seems precise enough for uniform constant conditions of grain feed and constant stiffness/elasticity of structural members. However, even in such circumstances the actual maximum pressure build-up in the baking mould could still considerably fluctuate given the disproportionately large effect of small distortions (tenths of micrometers) and of inhomogeneous grain distribution on the accuracy of the actual uppermost punch position and hence on final pressure.

According to the invention the end point A3 is not a fixed position preset by distance switch means, but is defined as a slightly variable point of a small region A3A'3 which is controlled by an adjustable short (extra)time duration during which a hydraulic valve for pressure build-up is kept open. Indeed, the final fraction A'3A3 of the total piston displacement having a stroke length A2-A3 corresponds to only a negligible displacement of the punch and thus to a comparitvely very small fraction of total crushing/compressing time. Accurate control of said time fraction as a separate additional regulation means (tenths of a second) from the central control panel, based on empirical test and correlation data related to grain feed parameters (pressure-time correlation curve of fed grains), provides at once a surprisingly effective and simple means for establishing consistent pressure-baking conditions, and hence ensuring uniform starting pressures for the consequent explosive grain expansion. On the other hand the finished cracker thickness and surface structure may be closely adjusted by a second timing means which actuates piston 14 for a preset time from its fallen back position B1 to a regulable position B3 between B1 and B2.

Thus, a complete cracker production cycle is preferably composed of the following actuating sequence and positions of the pistons 13 and 14: (A1-A2 start) B1-B2, A2-A3, B2-B1, B1-B3-B1, A3-A2.

FIG. 4 gives a more detailed view of a preferred design embodiment of a hydraulic drive unit used in an apparatus according to the invention. The hydraulic block 12 comprises two cylinders (71,72) with front and back flange (73,74) and a mid flange 17 fixed together by traction bars 40. The integral mid flange 17 is at the same time back flange of cylinder 71 and front flange of cylinder 72. It is shown that pistons 80 are withdrawn in their rest position close to said mid flange. The pistons actuate drive shafts (15,15') guided through the block flanges by bushings 76 and sealed by end seals (75,76). Reference numeral 45 denotes the screw connections for the hydraulic fluid supply tubes. The pistons are provided with a seal 77 and sliding guides (78,78'), both made from a frictionless material, e.g. PTFE to ensure high displacement speeds.

To increase the reaction velocity of the hydraulic shaft, which is most important at stroke reversal (fall back of punch upon expansion), the sliding resistance at the exits of front and back flanges is diminished by disposing there the combination of a damping ring 81 and sealing ring 82. Preferably the sealing ring is conical, to cooperate with a conical damping sleeve arranged at the end portion of drive shaft 15 (close to piston).

In this way erratic sticking and braking of the hydraulic shaft upon numerous reverse displacements (i.e. after full forward stroke and stop) is largely eliminated. Further improvements include the provision of conical damping chambers instead of the conventional damping cylinders in order to achieve a "progressive" damping at stroke end (mould closure) and at the same time to prevent a brake or friction effect when opening the mould. Said damping chambers are integrated in mid flange 17 and cooperate with a conically designed end portion 79 of the hydraulic shaft of each piston. Numeral 84 and 85 refer to a O-ring and an annular element. In addition air escape means are provided outside said damping chambers. Thus the novel integral two-cylinder design improves compactness, accuracy and actuation velocity of the hydraulic drive unit.

Figure 12:
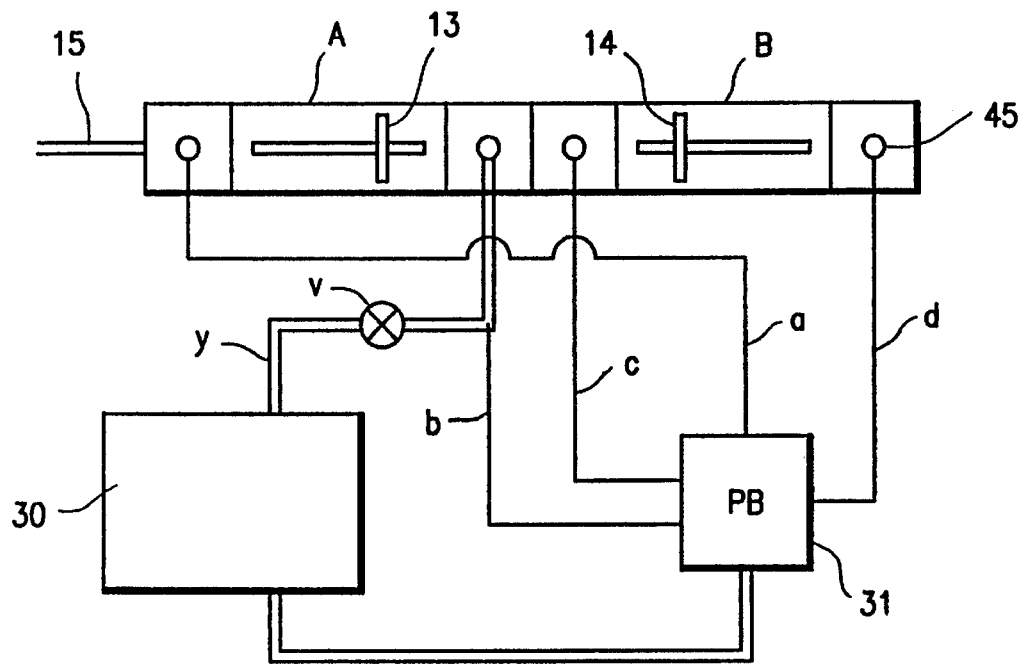
FIG. 12 is a further improvement to the hydraulic drive means shown in FIGS. 1, 3, and 4.

In FIG. 12 there is shown (schematic diagram) an improvement of the pressure oil circuit connecting the hydraulic jack means 3 and the oil pressurizing unit 4 (see FIG. 1, where the oil circuit lines are not depicted). Referring back to FIGS. 1 and 4, there are four oil feed lines (not shown) linking the pressurizing part (not shown in FIG. 1) of hydraulic unit 4 directly to the inlets (reference numeral 45 in FIG. 4) of jack cylinders A and B for activating double-action pistons 13 and 14 in a desired sequence of steps. According to the schematic diagram of FIG. 12 pressure oil lines designated as a, b, c and d feed oil pressure to double-action cylinders A and B from motorized pressure block PB. The valves (not shown) integrated in block PB allow activation of pistons 13 (of A) and 14 (of B) in either direction. Upon pressure release in cylinder A needed for expansion, oil flows back through line b to block PB. Oil removal speed, however, is dictated by the (small) valve passages in PB, which thus affect the withdrawal speed of punches 9 (see FIG. 1) and hence the expansion velocity. The proposed improvement according to the invention provides a branch-off or by-pass line y of oil line b to render oil independent from the fixed block PB. Thus drain line y flows directly in oil reservoir 30 connected to pressurizing block PB. An activatable valve V located in line y (or at any point between y and inlet/outlet 45 of line b) is automatically opened at expansion so that a major portion of the pressure oil flows directly from A to reservoir 32 (instead of passing through PB). Advantageously the linking portion of line b (including port 45) from cylinder A to drain line y has a greater cross-section, e.g. up to more than 50%, than lines a, b, c, d so as to further decrease oil drain time. By rendering valve passage V regulable, explosion degree of cracker expansion may be adjusted to a desired extent. This has a beneficial effect an required quality (swelling, etc. . . ), incl. color and toughness of the puffed crackers.

Figure 5:
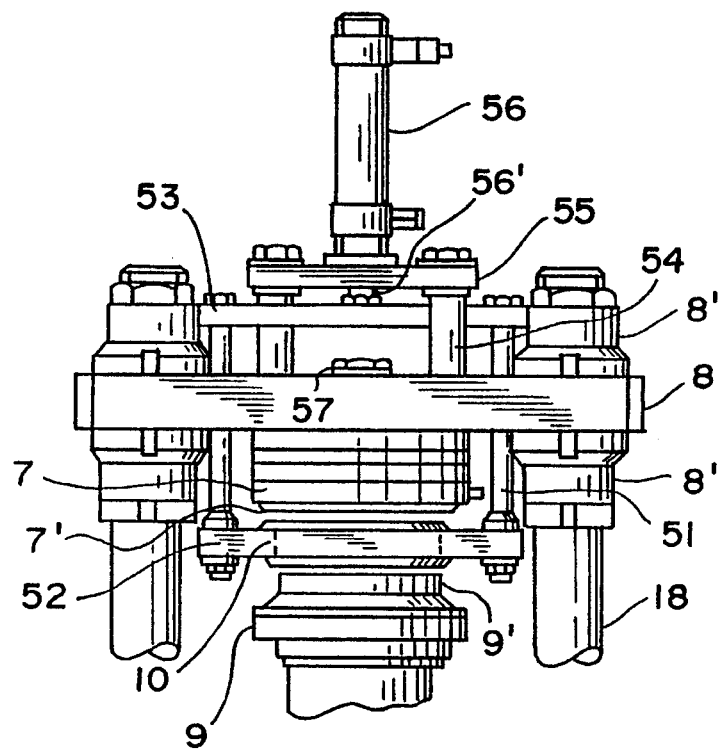
FIG. 5 shows more into detail a three-part mold used in the inventive apparatus depicted in FIGS. 1 and 2.

FIG. 5 illustrates the construction and arrangement of a three-part mould used in the apparatus of the present invention. Upper mould plate (8), adjustably fixed to columnar frame posts 18 by regulable nuts 8' bears upper mould 7 fixed thereto by a central mounting element 57. A fixed bridge 55 fixedly erected on mould plate 8 by means of pins 54 supports a pneumatic cylinder element 56 having a actuatable shaft 56' passing through fixed bridge 55. Shaft 56' is connected to a lower movable bridge frame 53 comprising guiding rods 51 slidably passing through corresponding bores in upper mould plate 7. The lower end portions of said guiding bars are connected to side flange elements 52 of ring mould 10. Punch 9 is arranged below upper mould 7. The upper portion of the punch (punch head 9') is adapted to be slidably received within the cavity of ring mould 10, the latter in its uppermost position, when pressed against upper mould 7 by pneumatic cylinder 56, being sealed by sliding over a corresponding die element 7' of upper mould 7. The height of the cylindrical upper portion 9' of punch 9 is at least equal and preferably slightly larger than the thickness of ring mould 10 (e.g. 20 mm versus 18 mm depending on desired cracker thickness).

Advantageous embodiments of said mould configuration comprise multiple-cracker moulds formed of a ring mould as depicted in FIG. 5 and comprising a plurality of cylindrical mold cavities of any desired shape.

Said cavities slidingly cooperate with a punch having a head 9' in the form of cylindrical elevations of the same pattern and shape of said ring mold cavities. In the same manner the lower surface of the upper mould is provided with cylindrical die elements of similar shape and pattern, but of smaller height (e.g. 4 to 10 mm). It has been found that said covering arrangement of simple cylindrical sliding contacts is surprisingly effective in sealing the mould cavity formed by the 3 cooperating mould elements. Examples are shown in FIGS. 6a through f for a moon-shaped cracker and in FIGS. 6e and 6f for bar-shaped crackers.

In addition to allowing the troublefree production of a plurality of small crackers with one mould set (without sticking), the present mould concept also has the advantage that it can be adapted to produce expanded crackers having a curved upper and lower surface, including comparatively thin crackers (chips).

For this purpose only the compressing surfaces of upper and lower mould elevations have to be designed as matching concave and convex surface, whereby the ring mould remains unchanged, except possible adaptation of ring thickness depending on degree of curvature and thickness of the expanded cracker.

To improve the anti-sticking property of the three-part moulds, it is advantageous to apply a thin anti-sticking coating onto their contacting surfaces. Preferably a coating essentially comprised of TIN (titanicum nitride), including TiC, TiO and nitrides carbides, carbonitrides of other desirable metals, is used. Said coating can be obtained by sputtering, ionplating, plasma CVD and similar high-tech deposition processes.

Figure 7:
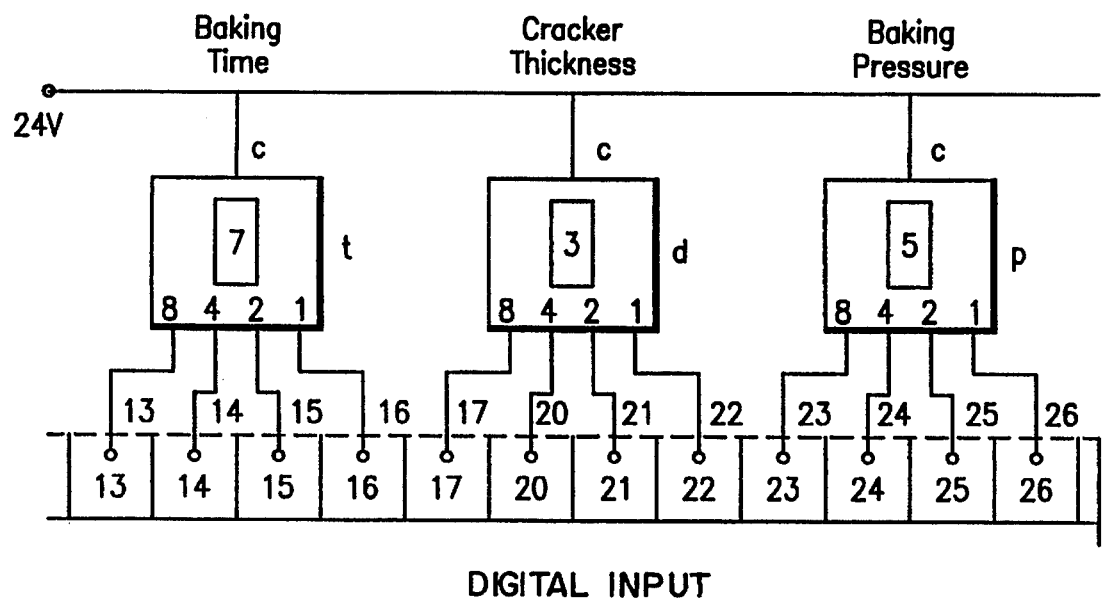

FIG. 2 (lower part) and FIG. 7 schematize an example of a central command and control cabinet (5). As can be seen from FIG. 7, the adjustable parameters baking pressure (P), baking time (t) and cracker thickness (d) are digitally fed to a programmed microprocessing unit of the Control system, which centralises commands and controls all the operational functions of the machine (drive means, feeding means, actuation means for ring mould, etc. . ). The mould temperature (T) is monitored, controlled and adapted by a separate processing unit. In a twin-head machine there are four mould elements equipped with resistance heaters disposed below the compressing surfaces of respectively upper moulds and punches which are preferably of a layered design to ease their assembly.

Each moulding surface is provided with a thermocouple fitted in a radial bore extending close to the central fixation means of said layered moulding elements. This enables a very accurate, instantaneous control of mould temperature, whereby deviation from a desired baking temperature (conveniently from about 280 degrees Celsius to 320 degrees Celsius) is kept within close tolerances of about max. 1 degree Celsius. This operational uniformity is achievable in fluctuating production conditions (ambient temperature, production rate, cracker weight/thickness) thanks to the self-tuning property of the programmed temperature control and processing unit.

An advantageous embodiment of the present invention is illustrated in FIGS. 8a–b. Accordingly two apparatuses A and B, in this case twin-head machines equipped with ring moulds is shown in FIG. 8a, are arranged in tandem at opposite sides of a central cracker discharge and conveying means (101) passing between them at the lower side of cracker discharge chutes (102) of their respective moulds, said conveying means being located above drive means (3,11). A single hydraulic drive unit (3) in accordance with this invention drives the two apparatuses simultaneously, which is achieved by linking the toggle mechanisms (11) of the apparatuses by a linking/transmission member (100). As can be seen from FIG. 8 b the grain feed and cracker push-off devices (2) are located at opposite sides of apparatuses A and B and of conveying means (101). Such an arrangement and layout is particularly advantageous in that it is very compact, room and labour saving and in that it needs only one sophisticated hydraulic drive system with corresponding central control panel for a plurality of cracker production mould sets (2×2 in this case), necessitating further only one machine setting/regulation for a quadrupled production. Of course a complete production line will consist of a series of such tandem driven apparatuses enclosing a central cracker discharge and conveyor belt which forwards a continuous stream of crackers to a convenient packaging station (not represented in the drawings).

To facilitate the subsequent cracker packaging operation the present invention additionally provides a cracker handling and collecting system by which the crackers coming from a discharge belt of a multi-machine cracker production line, are collected and prepared in the form of stacked groups of a desirable number of crackers, which stacks are then ready for packaging in any convenient way. In this way the cracker collecting and preparation system of this invention establishes an adaptable, automatic feeding link between a production line according to the present invention and a proper packaging station, and thereby saves the otherwise necessary manual work and interstation transports with conventional production lines where the crackers are mostly collected in bins or containers.

Figure 9:
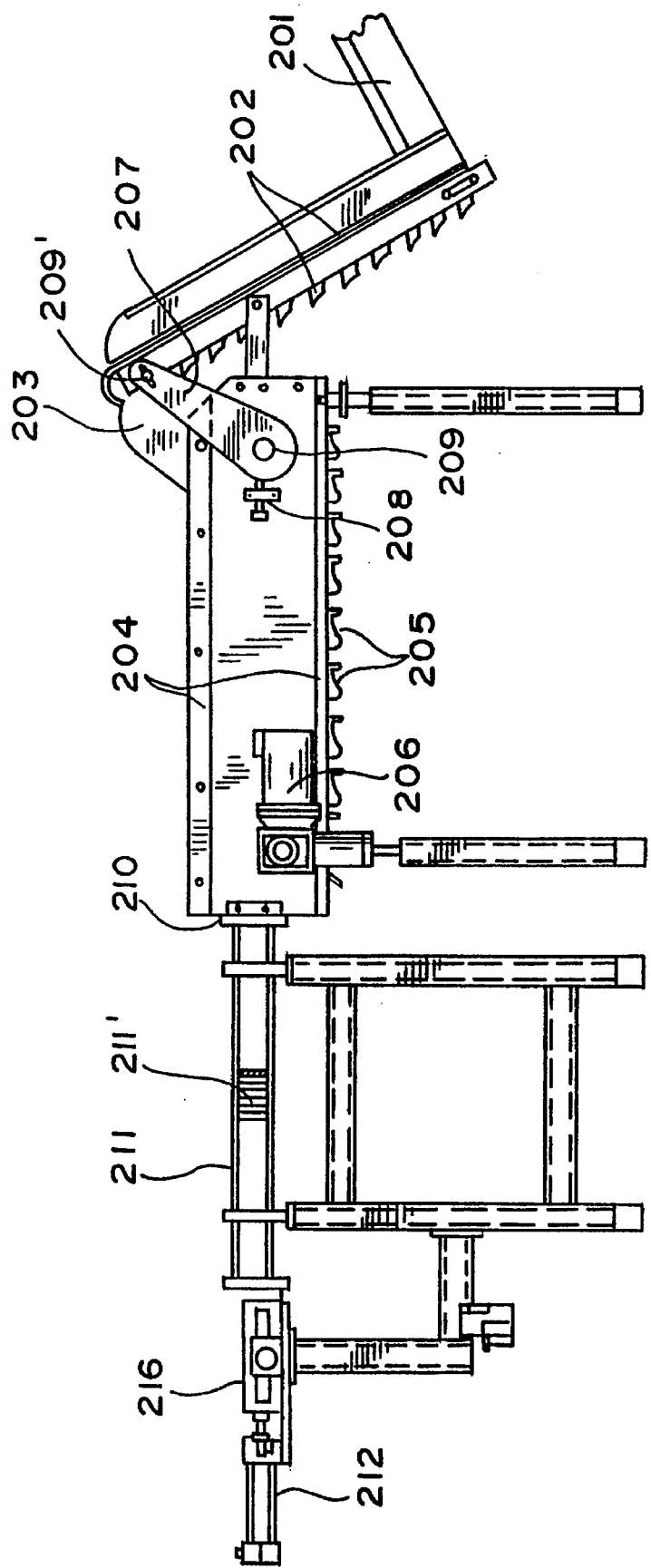
FIG. 9 is a side elevational vieuw of a cracker preparation collecting device coupled to a conveying belt of a multimachine cracker production line
Figure 10:
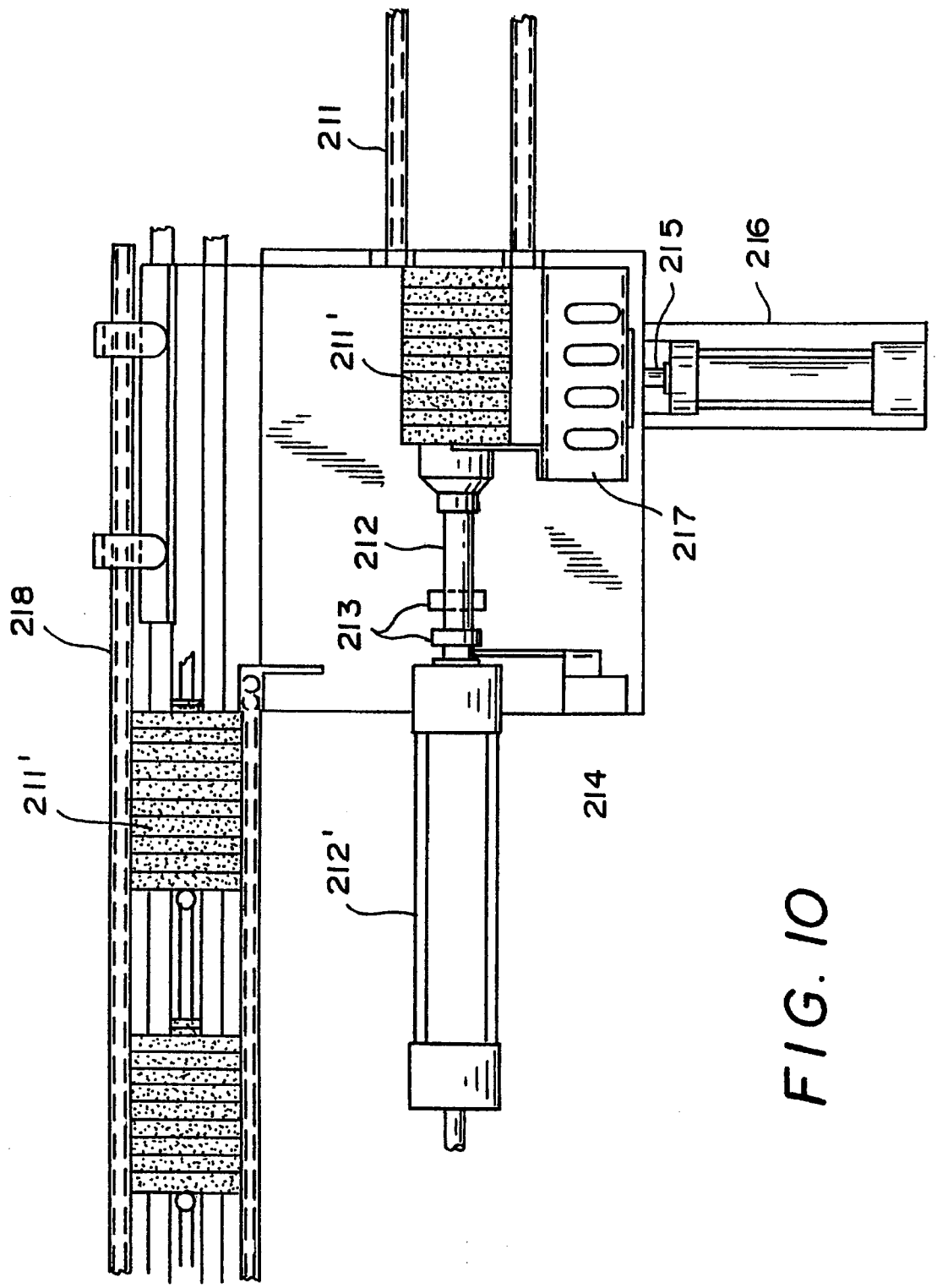
FIG. 10 is a top view of the end stage of the collecting device shown in FIG. 9, where the crackers are stacked in groups ready to be packaged

As can be seen in FIGS. 9 and 10, the cracker collecting/preparation system is essentially comprised of the combination of an inclined supply belt 202 and a horizontal feed preparation belt 204, and a stacking tunnel 209 at the end of which horizontal stacks containing a desired number of up-right standing crackers are moved stack by stack to a feed channel of a packaging machine.

The crackers coming from the conveyor belt of a cracker production line (see e.g. reference numeral 101, FIG. 8b) are discharged in a chute 201. From this point the crackers are separated and moved upwards by inclined belt 202 which delivers the crackers one by one to horizontal feed preparation belt 204 via connective sliding chute 203, such that each cracker is exactly dropped in one of the successive holder elements (205) from which preparation belt (204) is composed. For achieving correct delivery of the subsequent crackers in successive holders (205) the inclined belt (202) and preparation belt are synchronised. Firstly the frequency of electrive drive motor (206) is regulated to reach a desired speed of feed preparation belt (204) according to required cracker capacity, and then the supply speed and the position of inclined belt (202) are adjusted by means of synchronisation chain (207) and positioning element (208) acting on one of the chain wheels (209,209'). The preparation belt (204) moves the separated crackers each resting in a holder (207) to its turning end (210) where the holder elements (207) move them into an upright position and feed the crackers likewise in an upright position to the queueing end (210) of a horizontal stack of upright placed crackers (211') which is sequentially pushed a little bit forward by the passing holder with each new cracker joining the stack. The latter is slidingly supported and guided in a stack channel or tunnel (211') of appropriate cross-section.

At its opposite end, i.e. when the stack leaves the cracker guide (211), the stacked crackers are withheld by a pneumatic piston element (212). An adjustable ring element (213) of said piston determines the stack length to be packaged, i.e. number of crackers per package. Indeed, when piston (212) is pushed back to this point by the forward sliding stack of crackers completely filling tunnel (211), switch element (214) is activated, piston (213) is withdrawn, and piston (215) of pneumatic stack mover (216) is actuated to shift the prepared stack of crackers (216), by means of its adaptable stack pushing member (217), towards the feed channel (218) of a packaging machine (not shown).

This additional improvement according to the present invention allows the cracker production of our inventive cracker manufacturing line to be fed in a completely automatic manner to a cracker packaging station.

A further improvement aspect of-a multi-machine cracker manufacturing equipment of this invention consists in the provision of remote control, sensing and inspection means for each machine which is linked by suitable data communication lines to a central command and computer system. In this configuration the main parameters (time, mould, temperatures, expansion thickness) and production data of each machine can be individually followed and supervised, and hence the machine programm of a given machine may be centrally adapted if necessary (e.g. cycle pace, baking temperature, etc. . ). Moreover, by inclusion in each machine of separate auxiliary sensing means for quality control, e.g. cracker color measurement and/or black spot identification which gives an idea of baking degree and occurence of burnished areas, it becomes possible to couple quality supervision with preventive maintenance, e.g. by installment of automatic mould cleaners or steamers. In the latter case, a given machine will be automatically stopped when something is seriously wrong with its cracker appearance, whereafter the mould steamers of this machine will be put in operation to clean the mould parts by steam jets for a predetermined duration.

Figure 11:
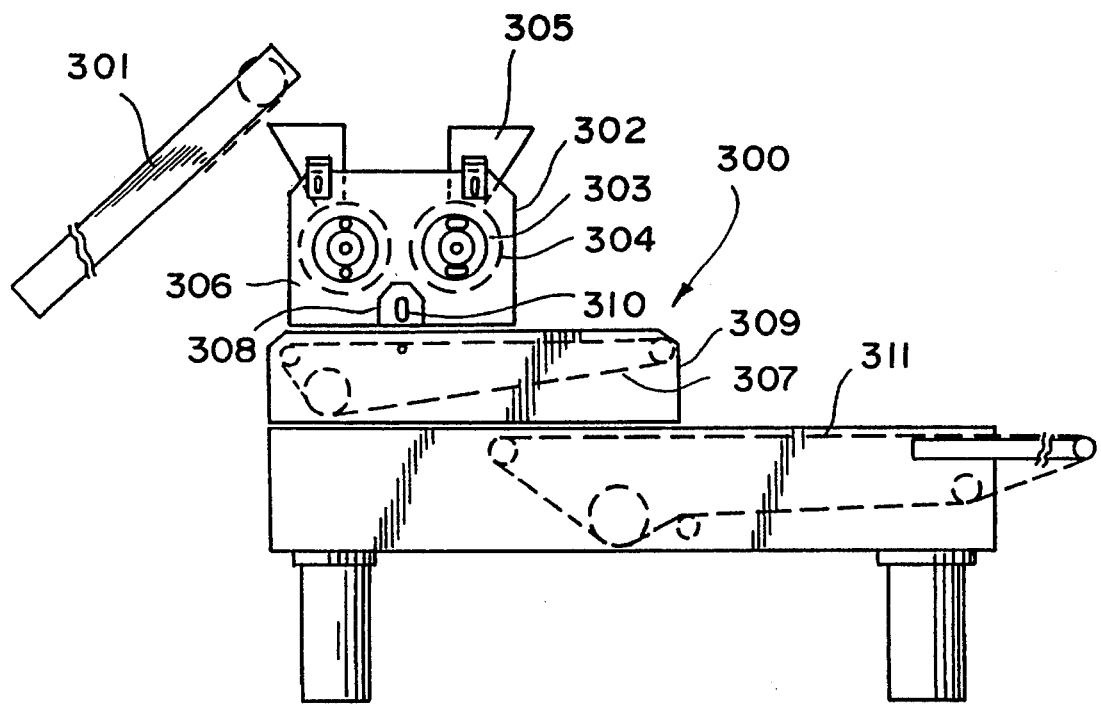
FIG. 11 is a side elevational view of a cracker coating station.

FIG. 11 shows a preferred lay-out of a coating station for continuously coating crackers supplied by a discharge/transfer conveyor of a cracker production line including a plurality of twin-head baking apparatuses.

Coating station 300 is fed by cracker supply belt 301 (preferably of the type denoted by ref. numerals 201 to 203 in FIG. 9). The crackers (not shown), regularly disposed in one or more rows, are introduced via an sliding chute between slowly rotating coating rolls 303 of coating head 302 designed as a container with symmetric compartments 306. Coating liquid is supplied to the roll surfaces 304 through inlets 305 spanning the axial length of the rolls. The coating rolls have a surface layer 304 comprised of resilient, foam-like material which is impregnatable by coating liquid, e.g. a chesse containing liquid. The underside of the coating rolls may be dipped in the liquid retained in container compartments 306. The supplied rows of crackers are gently gripped between the resilient, liquid covered and impregnated roll surface layers 304 and hence coating with minor spillage during their transfer from between the rolls to a (wire) transfer belt 307 disposed in part 309 designed as a container for collecting the overcoat liquid dripping off the crackers. Separation element 308, forming the inner lateral sidewalls of compartments 306, is open-ended at the top and bottom allowing smooth discharge of coated crackers 310 into belt 307. From there the crackers are transferred to a belt 311 running through a drying station (not shown). The coated and dried crackers may therefor be conveyed to a packaging station as shown in FIG. 10.

I claim:

1. A high capacity apparatus for simultaneously producing granular crackers from cereal raw materials by pressure-baking and expanding a given quantity of cereal material within a heated mould, the apparatus comprising:

a) moulding means including at least two separate three-part moulds situated in tandem, each of said three-part moulds including a heatable, fixed upper mould plate, a movable peripheral mould element and a heatable punch element to be received within said peripheral mould element in a fluidtight manner;

b) said mould plate, said peripheral mould element and said punch element cooperate vertically with each other to form a hermetically closed separate mould cavity for compressing and heating therein a granular material into a pressed product of predetermined shape that is readily removable from said mould cavity;

c) frame means for supporting said mould plates on said apparatus, said frame means configured to slidably receive therethrough a cooperating pair of guide bars extending perpendicular to each of said mould plates, each of said pair of guide bars supporting a separate one of said peripheral mould elements for selective engagement with a respective one of said mould plates;

d) means for interconnecting each of said punch elements for simultaneous operation;

e) means for selectively driving said interconnected punch elements into and out of the corresponding one of said mould cavities causing the respective one of said three-part moulds to simultaneously assume one of said open, closed or expanded positions;

f) means for feeding granular material cooperating with said moulding means;

g) said driving means comprising an integral drive unit having cooperating first and second jack means;

h) said first jack means for selectively driving each of said interconnected punch elements into and out of the respective one of said mould cavities thereby allowing each of said three-part moulds to assume either said open position or said closed position;

i) said second jack means for partially driving each of said interconnected punch elements out of the respective one of said mould cavities to allow each of said three-part moulds to assume said expanded position;

j) first timing means operatively associated with said first jack means for variably adjusting the extent of forward movement of each of said interconnected punch means into the respective one of said mould cavities to optimize cavity baking pressure; and k) second timing means operatively associated with said second jack means for variably adjusting the extent of post pressure-baking rearward movement of each of said interconnected punch elements out of the respective one of said mould cavities to limit cereal expansion within said mould cavities and hence product thickness.

2. The apparatus of claim 1, and further comprising:

a) control means for integrating operation of said moulding means, said driving means, said feeding means, said first timing means and said second timing means.

3. The apparatus of claim 2, wherein:

a) said control means including means for monitoring the physical characteristics of the granular feed material; and b) said first and second timing means are adjusted by said control means in response to changes in the physical characteristics of the granular feed material.

4. The apparatus of claim 2, wherein:

a) said drive unit is operatively connected to said interconnecting means by a two-arm transmission member.

5. The apparatus of claim 4, wherein:
a) said drive unit includes a single drive shaft operably connected to said interconnecting means;
b) each of said first and second jack means comprising a hydraulic jack; and
c) said first and second hydraulic jacks are positioned back-to-back and selectively cooperable to actuate said single drive shaft.

6. The apparatus of claim 5, wherein:
a) said first and second hydraulic jacks include first and second double-action pistons, respectively; and
b) said first piston selectively drives said single drive shaft as well as said second hydraulic jack.

7. The apparatus of claim 6, wherein:
a) said second piston selectively drives said single drive shaft.

8. The apparatus of claim 6, wherein:
a) the extent of forward movement of said first jack means and the extent of rearward movement of said second jack means equal the stroke lengths of said first and second double-action pistons, respectively.

9. The apparatus of claim 6, wherein:
a) said first timing means and said second timing means variably adjust the stroke lengths of said first and second double-action pistons, respectively.

10. The apparatus of claim 7 and wherein:
a) said second piston includes means for driving said drive shaft in the same direction as the direction of movement of said second piston.

11. The apparatus of claim 6, wherein:
a) said first piston includes means for driving said drive shaft in a direction opposite to the direction of movement of said first piston.

12. The apparatus of claim 1, and including:
a) means cooperating with said moulding means for releasing the pressed products therefrom.

13. The apparatus of claim 1, and including:
a) means for controlling the motion of said peripheral mould element wherein said peripheral mould element is slidable up and down along said frame means.

14. The apparatus of claim 8, and including:
a) a hydraulic drive system operating said first and second double-action pistons, said hydraulic drive system operated by said control means;
b) said hydraulic drive system including valve means for controlling fluid flow into and out of said first and second double-action pistons to change stroke length; and
e) said first and second timing means control the length of time said valve means is open to variably adjust the extent of forward and rearward movement of said integral punch elements.

15. The apparatus of claim 6, and including:
a) means for damping said first and second double action pistons.

* * * * *